(12) United States Patent
Frees

(10) Patent No.: US 6,178,059 B1
(45) Date of Patent: Jan. 23, 2001

(54) METHOD FOR WRITING SERVO INFORMATION ON A MAGNETIC RECORDING DISK

(75) Inventor: Gregory Michael Frees, Los Altos, CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/176,056

(22) Filed: Oct. 20, 1998

(51) Int. Cl.[7] ................................................ G11B 21/02
(52) U.S. Cl. ..................... 360/75; 360/97.02; 360/77.08
(58) Field of Search ........................... 360/55, 75, 97.02, 360/77.08, 77.02, 78.04, 78.14, 230, 234, 260, 264

(56) References Cited

U.S. PATENT DOCUMENTS

| 4,367,503 | 1/1983 | Treseder . |
| 4,556,969 | 12/1985 | Treseder et al. . |
| 5,319,509 | * 6/1994 | Michelson et al. ............... 360/77.03 |
| 5,422,766 | * 6/1995 | Hack et al. ........................ 360/97.02 |
| 5,454,157 | 10/1995 | Ananth et al. . |
| 5,627,698 | * 5/1997 | Malek ..................................... 360/75 |

FOREIGN PATENT DOCUMENTS

| 61-115291 | 6/1986 | (JP) . |
| 61-292289 | 12/1986 | (JP) . |
| 62-137790 | 6/1987 | (JP) . |
| 1-92986 | 4/1989 | (JP) . |
| 5-20824 | 1/1993 | (JP) . |
| 6-124552 | 5/1994 | (JP) . |
| 8-111017 | 4/1996 | (JP) . |

* cited by examiner

Primary Examiner—Alan T. Faber
(74) Attorney, Agent, or Firm—Robert B. Martin

(57) ABSTRACT

A method for writing circular track position information on a magnetic recording disk comprising the steps of (i) rotating the magnetic recording disk, and (ii) aerodynamically floating in a helium atmosphere a magnetic recording head adjacent to the disk and writing with the head circular track position information on the disk.

3 Claims, 2 Drawing Sheets

METHOD FOR WRITING SERVO INFORMATION ON A MAGNETIC RECORDING DISK

BACKGROUND OF THE INVENTION

1. Field of the Invention

The present invention relates to a method for writing servo information on a magnetic recording disk.

2. Description of the Background Art

Digital magnetic recording devices for data storage generally comprise a thin film magnetic recording disk and a head or transducer which is moved along or above the surface of the rotating disk to electromagnetically read and write information on the disk. Advanced thin film magnetic recording disks comprise a rigid substrate, a magnetic layer such as a cobalt-based metal alloy, a protective amorphous carbon layer, and a lubricant layer such as a perfluoropolyether disposed on the carbon overcoat.

During operation of the disk drive system, an actuator mechanism rotated by a voice coil motor (vcm) moves the magnetic transducer to a desired radial position on the surface of the disk rotating on a spindle where the head electromagnetically reads or writes data. Usually, the head is integrally mounted in a carrier or support referred to as a "slider". A slider generally serves to mechanically support the head and any electrical connections between the head and the rest of the disk drive system. The slider is aerodynamically shaped to glide over moving air and maintain a uniform distance from the surface of the rotating disk, thereby preventing the head from undesirably contacting the disk.

The head reads or writes data to or from a large number of concentric circular tracks formed on the magnetic disk. The shape and position of each track is defined by magnetic servo information (track identification information) permanently written onto the disk for each track. Servo information ensures that during operation of the disk drive, the head is centered over the desired track. Individual servo information is imbedded around the circular track in either a sector or continuous fashion. In order to avoid reading and writing data errors, it is desired that each track be a perfect circle correctly centered on the disk. Deviation of a track from a perfect circle or off center will cause it to be squeezed together with adjacent tracks. During the writing process, data can be overwritten on a squeezed adjacent track, resulting in loss of data. Therefore, it is important that servo information which defines the track position and shape be accurately written on the disk.

The magnetic servo information is generally written on a magnetic recording disk using the recording device's own head while the disk is spinning on the spindle of the recording device. However, it is important during the process to accurately position and hold the actuator so that the head is at the desired radial location on the disk. After servo information has been written on a track, the actuator is then repositioned to write the next track. One method for accurate positioning of the actuator during the servo track write (STW) process involves using an external positioner to locate the actuator and hold it steady while the track is being written. This external device is often called a "pusher".

The pusher contacts the actuator of the disk drive, pushes it to the desired location, and then holds it steady while the track is being written. This sequence of "push" and "hold steady" is repeated until the entire surface of the disk has been written with concentric circular servo tracks. The pusher generally consists of a mechanical arm and pin that reaches inside the drive and physically contacts the actuator. A contact force may be maintained between the pusher pin and actuator by putting a DC current in the VCM which results in a DC force on the actuator to hold it against the pin. The pusher arm/pin is connected to a motor which positions the arm/pin. The position of the pusher is determined with a measurement device (i.e. encoder, or laser, etc.), and this position is controlled by a closed-loop feedback control system. The closed-loop control allows the pusher to move a desired distance and then lock itself into position while the track is being written.

The use of a STW pusher requires that there be physical access into the interior of the completed disk drive so that it can contact the actuator. Access may be accomplished by an opening or slot in either the cover or base casting to accommodate the full-stroke of the pusher as it moves the actuator over the disk surface.

In order to achieve accurate writing of servo information, JP6-124522, published May 6, 1994, discloses placement of a plate between adjacent disk during the writing process to decrease the vibration of the disks and decrease the quantity of air colliding against the STW head arm. It is desirable to minimize vibrations of the drive during STW in order to facilitate the writing of circular tracks. The presence of vibrations during STW can result in wavy (or non-circular) tracks. However, the arrangement disclosed in this patent application is cumbersome. JP1-92986, published Apr. 12, 1989, discloses evacuating air from the disk drive device during the servo write process. However, since the slider requires a gaseous medium to fly over the disk, evacuation can result in the head crashing into the disk surface. Therefore, there still is a need in the art for an improved process for writing servo information to a magnetic recording device.

It is an object of the present invention to provide an improved process for writing servo information to a magnetic recording device.

Other objects and advantages will be apparent from the following disclosure.

SUMMARY OF THE INVENTION

The present invention relates to a method for writing circular track position information on a magnetic recording disk comprising the steps of (i) rotating the magnetic recording disk and (ii) aerodynamically floating, in a helium atmosphere, a magnetic recording head adjacent to the disk and writing with the head circular track position information on the disk. Preferably, the track position information is written to the disk with the magnetic heads of a disk drive with the disk spinning on the spindle of the disk drive. The process of the present invention improves the accurate positioning of the track position information.

A more thorough disclosure of the present invention is presented in the detailed description which follows and the accompanying figures.

DETAILED DESCRIPTION OF THE INVENTION

The present invention relates to an improved method for writing track position information (servo information) for a magnetic recording device.

Figure 1:
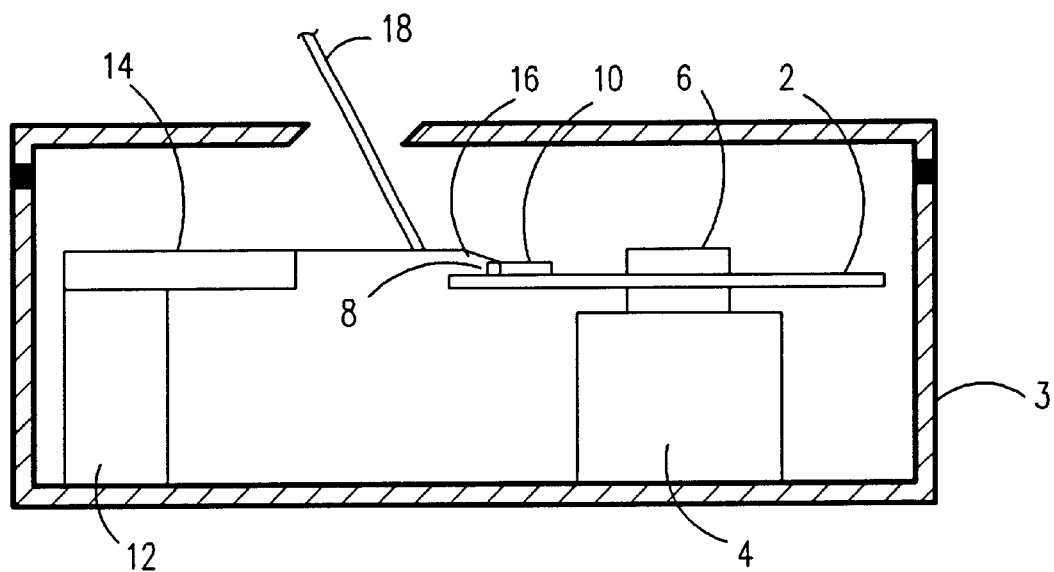
FIG. 1 is a section view of the magnetic recording disk drive.
Figure 2:
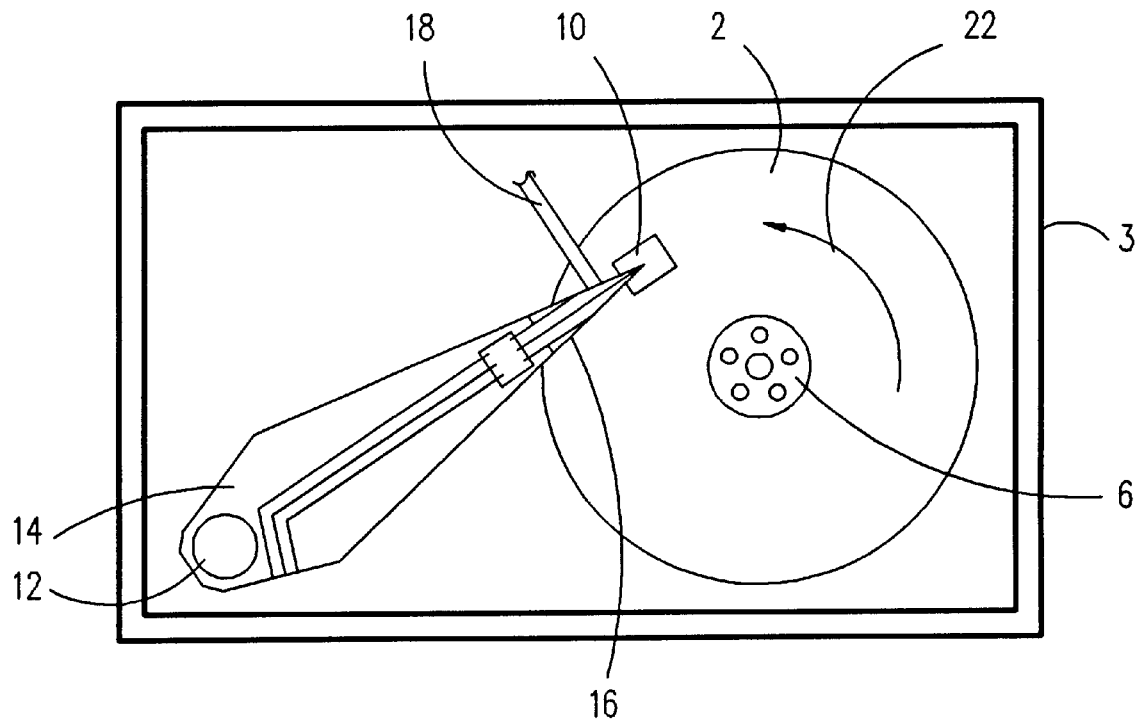
FIG. 2 is a top view of the magnetic recording disk drive.

Referring to FIGS. 1 and 2, there is shown a magnetic recording disk drive suitable for use in the method of the present invention. The magnetic recording disk 2 is rotated by drive motor 4, with hub or spindle 6, which is attached to the drive motor. The disk suitably comprises a substrate, a metallic magnetic layer, a carbon layer and a polymeric lubricant layer, e.g., perfluoropolyether. A read/write head or transducer 8 is formed on the trailing end of a carrier, or slider 10. Head 8 may be an inductive read and write transducer or an inductive write transducer with a magnetoresistive read transducer. The slider 10 is connected to the actuator 12 by means of a rigid arm 14 and a suspension 16. The suspension 16 provides a bias force which statically loads the slider 10 onto the surface of the recording disk 2. During the servo track writing process, a pusher 18 is in contact with arm 14 and positions and holds the slider 10 at the proper location during the servo track writing process.

The method of the present invention for writing circular track identity and position information on a magnetic recording disk involves the steps of (a) rotating the magnetic recording disk, (b) aerodynamically floating in a helium atmosphere a magnetic recording head adjacent to the disk, and (c) writing with the head circular track identity and position information on the disk.

Referring to FIGS. 1 and 2, in one embodiment of the method of the present invention, the drive motor 4 rotates the disk 2 at a constant speed in the direction of arrow 22 in the helium atmosphere, and the pusher 18 moves the slider 10 generally radially across the surface of the disk 2 as it writes each of the circular concentric tracks.

The key feature of the method of the present invention is performing the STW method in a helium atmosphere. As used herein, helium atmosphere means an atmosphere has greater than 40% helium and more preferably greater that 60% helium. Suitably, the atmosphere will comprise air and helium. The helium atmosphere reduces the magnitude of the waviness of the substantially circular tracks formed in the writing process.

In an embodiment of the present invention, the STW method is performed in a hard disk drive device which has been assembled with the components positioned within the housing of the drive. The hard disk drive device is substantially enclosed except for the opening in the housing to allow access for the pusher. In this embodiment, the helium atmosphere may be introduced into the housing with a positive low volume flow of helium through a hole (not shown) in the cover 3. This method can be easily implemented into present manufacturing operations and will result in improved track formation.

The following example is a detailed description of the present invention set forth above. The example is presented for illustrative purposes only, and is not intended as a restriction on the scope of the invention.

During operation of a magnetic disk drive, transverse disk vibrations were measured as a function of the spindle speed of the disk drive. The disk drive was operated in ambient air and then in a helium atmosphere. The disk vibrations are measured with a laser doppler vibrometer (LDV). The LDV beam is located at the outer diameter (OD) of the disk, and is oriented to measure transverse (out of the plane of the disk) vibrations through a small hole in the cover of the disk drive. The vibration data is analyzed to determine the overall RMS magnitude for a particular disk speed. Then the disk speed is increased and the measurement is repeated.

Figure 3:
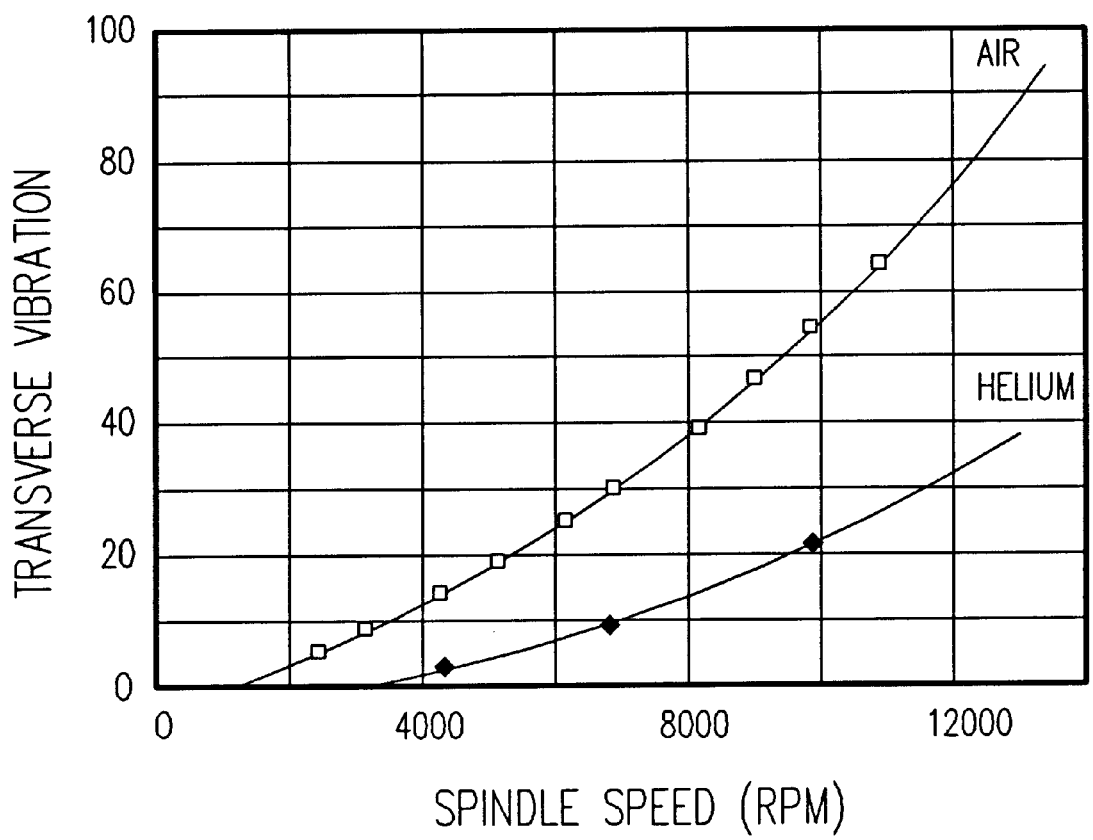
FIG. 3 is a graph illustrating the improvement utilizing the method of the present invention.

The results are shown in FIG. 3, which is a graph of transverse disk vibration ($\mu$inches RMS) vs. spindle speed (RPM). It can be seen that there is a substantial decrease in disk vibration when the drive is operated in a helium atmosphere.

Although this invention has been described with respect to specific embodiments, the details thereof are not to be constructed as limitations, for it will be apparent that various embodiments, changes, and modifications may be resorted to without departing from the spirit and scope thereof, and it is understood that such equivalent embodiments are intended to be included within the scope of this invention.

I claim:

1. A method for writing circular track position information on a magnetic recording disk enclosed in a magnetic recording device comprising the steps of
   (a) rotating the magnetic recording disk on a spindle attached to the motor of the recording device;
   (b) aerodynamically floating in a helium atmosphere a magnetic recording head adjacent to the disk, the head is supported on a slider which is connected to an actuator, the actuator is joined to an external pusher for controlling movement of the head;
   (c) moving the head radially across the disk with the pusher; and
   (d) holding the head steady while writing circular track position information on the disk with the head.

2. The method of claim 1 wherein the helium atmosphere comprises greater than 40% helium.

3. The method of claim 1 wherein the helium atmosphere comprises greater than 60% helium.

* * * * *